United States Patent

[11] 3,555,198

[72] Inventors James Lawrence Stepan Humboldt; John Samuel Welch, Milan, Tenn.
[21] Appl. No. 718,318
[22] Filed Apr. 1, 1968
[45] Patented Jan. 12, 1971
[73] Assignee International Telephone and Telegraph Corporation a corporation of Delaware

[54] IDENTIFIER TO DETERMINE THE CLASS OF SERVICE TO WHICH A SUBSCRIBER IS ENTITLED
5 Claims, 5 Drawing Figs.

[52] U.S. Cl. .......... 179/18
[51] Int. Cl. .......... H04m 3/38
[50] Field of Search .......... 179/18.19, 18.2, 18.61

[56] References Cited

UNITED STATES PATENTS

| | | | |
|---|---|---|---|
| 3,133,157 | 5/1964 | Platt et al. .......... | 179/18(.2) |
| 3,204,036 | 8/1965 | Bray et al. .......... | 179/18(.19) |

*Primary Examiner*—Kathleen H. Claffy
*Assistant Examiner*—Thomas W. Brown
*Attorneys*—C. Cornell Remsen, Jr., Rayson P. Morris, Percy P. Lantzy, J. Warren Whitesel and Delbert P. Warner

ABSTRACT: Identifier circuits are provided for determining which services a calling telephone subscriber is entitled to dial. The identifier circuits also provide identification of the originating central office when more than one central office is serviced by the equipment. Means are provided for routing permitted calls automatically to called parties and for routing unauthorized calls for special screening.

INVENTORS
JAMES L. STEPAN
JOHN S. WELCH
BY
Delbert O. Warner
ATTORNEY

IDENTIFIER TO DETERMINE THE CLASS OF SERVICE TO WHICH A SUBSCRIBER IS ENTITLED

This invention is related to that disclosed in application Ser. No. 581,371, entitled "Calling Subscriber Identification Circuit" filed on Sept. 22, 1966, now U.S. Pat. no. 3,522,385 in the names of J. L. Stepan, D. V. Carmody, J. S. Welch and A. Unseran.

The present invention relates to the identification of the class of service to which a caller is entitled. It also relates to the identification of the originating central office when more than one central office is serviced by identifier equipment. This identification may be used also in the control of equipment to limit the calls of certain restricted would-be callers for toll assessing purposes. The invention may be described furthermore as relating to an end office identifier which discriminates between classes of callers, determines originating office, directs certain calls for special screening, and sends directory number of authorized calling subscribers to a toll center.

In modern dial telephone systems, and particularly with the increased use of automatic equipment, as in direct long distance dialing, there is a need for facilities capable of automatically assessing tolls against the correct party. This is true especially when two or more office codes are involved within the same central office switching system. At the same time it is necessary to make certain that toll calls are not permitted from telephone instruments which have been restricted to certain classes of calls, such as to local calls (nontoll calls) only.

At the present time, in the United States, the bulk of all long distance calls pass through long lines controlled by the Bell System. The Bell System incorporates toll determining equipment (such as that called CAMA for "Automatic Message Accounting") which has proven satisfactory for that System when it uses its own identification equipment. However, when independent telephone companies connect into the Bell System long lines equipment, compatibility requires that the independents provide essentially the same type of CAMA identification. In many cases, compatibility has been difficult to achieve and the independents have required the service of an operator even when direct dialing would otherwise be feasible.

Thus, objects of the present invention include the provision of means for determining whether a calling party is entitled to a particular class of service and for automatically supplying the telephone number of such a calling party to toll determining equipment while diverting unauthorized calling parties to other equipment or an operator. Another object is to recognize subscribers having the same subscriber number (last four digits of the directory number), but which are under separate office codes, where each of the codes is serviced by the same central office switching system.

The foregoing objects and others ancillary thereto may be attained in conjunction with an identifier which provides the required subscriber identification. Assume a demand for service has been extended from a subscriber through an outgoing trunk to a toll center. Then the outgoing trunk, in response to an off-hook signal received from the toll center (CAMA center), requests a number to identify the calling subscriber from the identifier. The identifier acknowledges the demand and starts a sequencer. If the calling subscriber is entitled to make the call, the sequencer sequentially reads the calling number from an identification matrix and drives an MF Sender, or Multifrequency Sender, which in turn sends the identification digits to the toll center via the outgoing trunk. In the event the calling subscriber is not entitled to make toll calls or is otherwise restricted, suitable controls are provided to route the call to other than the toll center.

The novel features characteristic of this invention are set forth with particularity in the appended claims. The invention itself, however, both as to its organization and its method of operation together with additional objects and advantages thereof, will be better understood from the following description of specific embodiments when read in connection with the accompanying drawings, in which:

Figure 1:
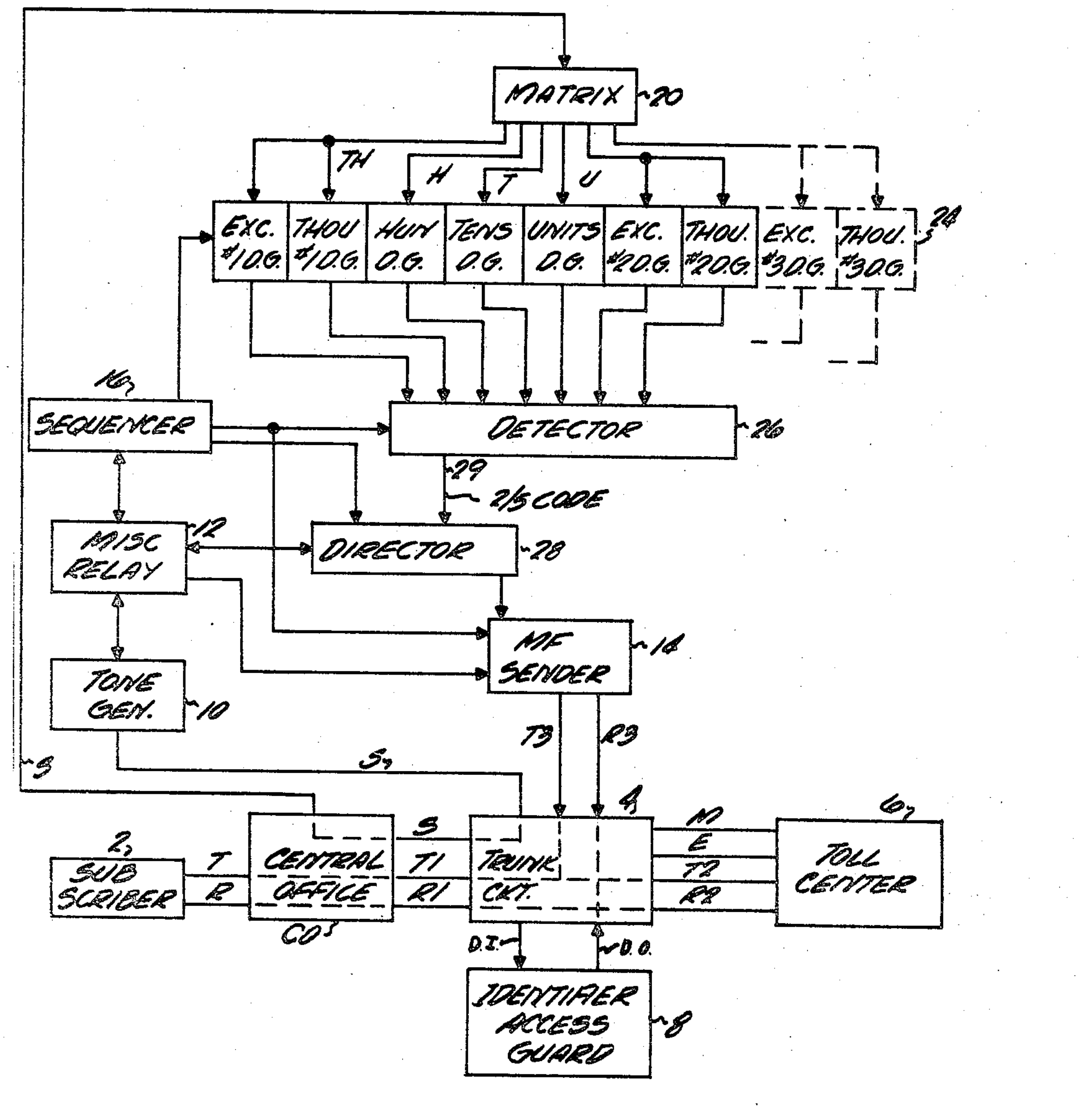
FIG. 1 is a block diagram depicting a system arrangement which is useful in the practice of the invention.

Turn first to FIG. 1 for a general description of the invention. When the subscriber station 2 goes off-hook, it is connected through tip and ring conductors T and R to a line circuit (not shown) forming part of the central office equipment (CO). Dial tone is returned if the system is available for calls. If a toll ticketing type of call is being placed, the subscriber then dials an access code including a circle digit, if this scheme of party identification is being used. The trunk circuit 4 is seized over the central office loop, including tip and ring conductors T1 and R1 usually from a selector level. Ground is returned on the sleeve lead S and the CAMA toll center 6 is seized over the M lead in the case of E and M trunks and by outgoing loop including tip and ring T2 and R2 on loop trunks.

The subscriber then dials the area code and the called subscriber's number. When this is complete, answer supervision is returned from the toll center either on the E lead if E & M signalling is used, or by loop battery reversal if loop trunks are used.

On receiving answer supervision as described above, the CAMA trunk circuit 4 extends a demand-in signal DI into the identifier access guard circuit 8. If no other CAMA trunk circuits are accessing the identifier at this time, a demand-out signal (DO) is returned to the trunk circuit 4, thereby allowing it to access the identifier, which includes the blocks 10—28.

When the CAMA trunk circuit 4 has been connected to the identifier, the subscriber's sleeve lead S is extended into the identifier where it is connected to the tone generator 10 via the trunk circuit 4. The sleeve lead is also terminated on the matrix 20 at a location corresponding to the calling subscriber's number. The trunk tip and ring conductors T3 and R3 are extended to the output of the MF sender 14. When the miscellaneous relay circuit 12 is accessed, a start signal is given to the sequencer 16. Responsive thereto, the sequencer will run through its cycle of operation. Control of identification read is thereby given to the sequencer.

The subscriber 2 may be restricted to particular kinds of calls, may be calling as one of any of several central office codes, may be a pay station limited to local calls and may have other specific limitations placed on its capacity to call. Under the circumstances, it is necessary to determine which limitations apply and to provide suitable indications to the CAMA center and/or to other equipment.

Figure 2:
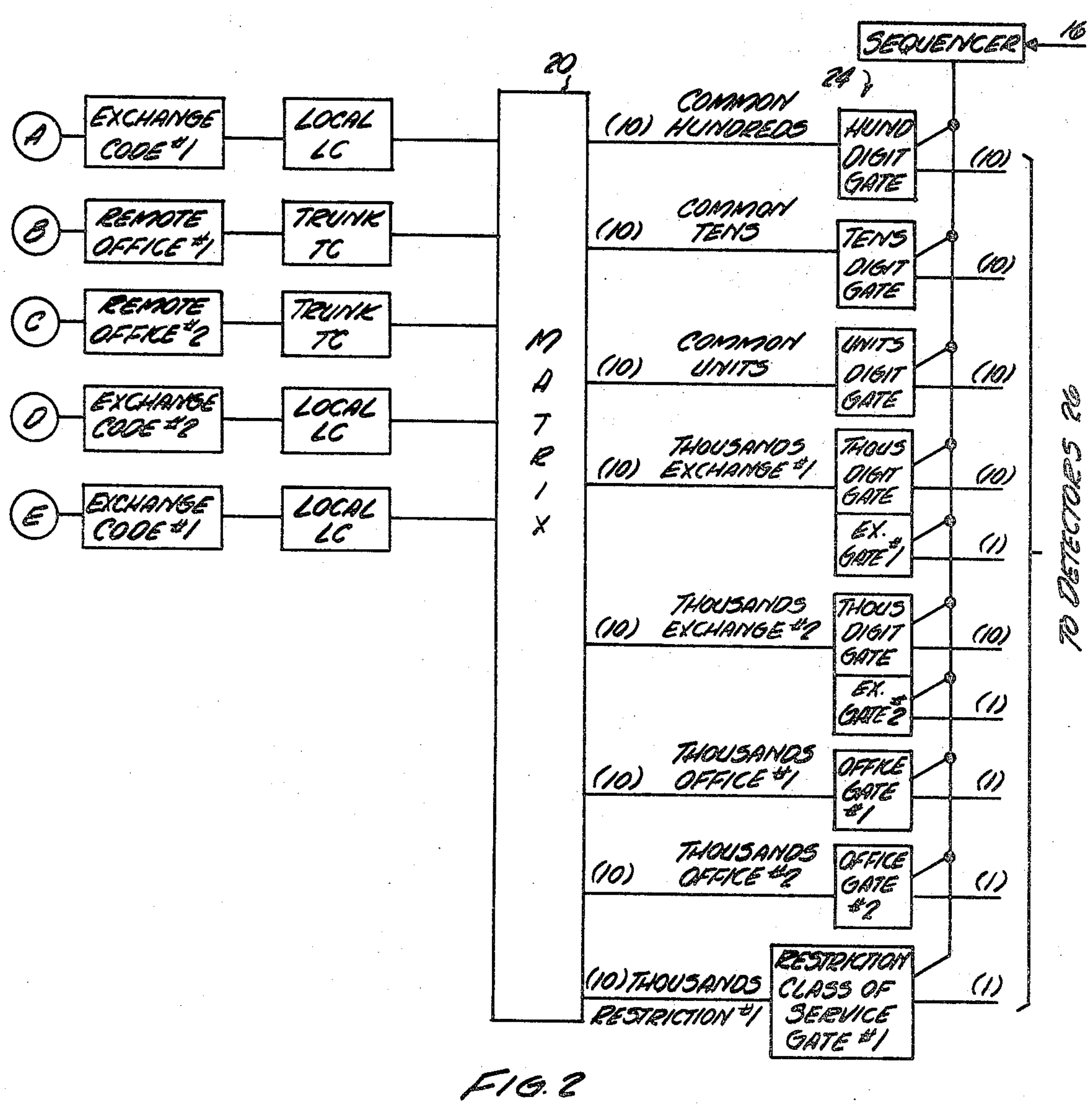
FIG. 2 is a block diagram showing the relationships of certain elements of use in determining class of service.

Limitations on class of service such as limitations on pay stations, local call restrictions, etc. are represented in FIG. 2 where each of the subscribers A, B, C and D may be entitled to a different class of service. Each of these, as well as subscriber E, is connected individually and uniquely through a sleeve from its line circuit LC or a trunk circuit TC into the matrix 20 where a connection is completed to appropriate ones of the gates 24 under control of the sequencer 16 and other control equipment, some of which is not illustrated. It should be noted that the EX Gates, Office Gates, Digit Gates and Restriction Gate referred to in the blocks may be identical units with different labels to clarify their respective functions.

Figure 3:
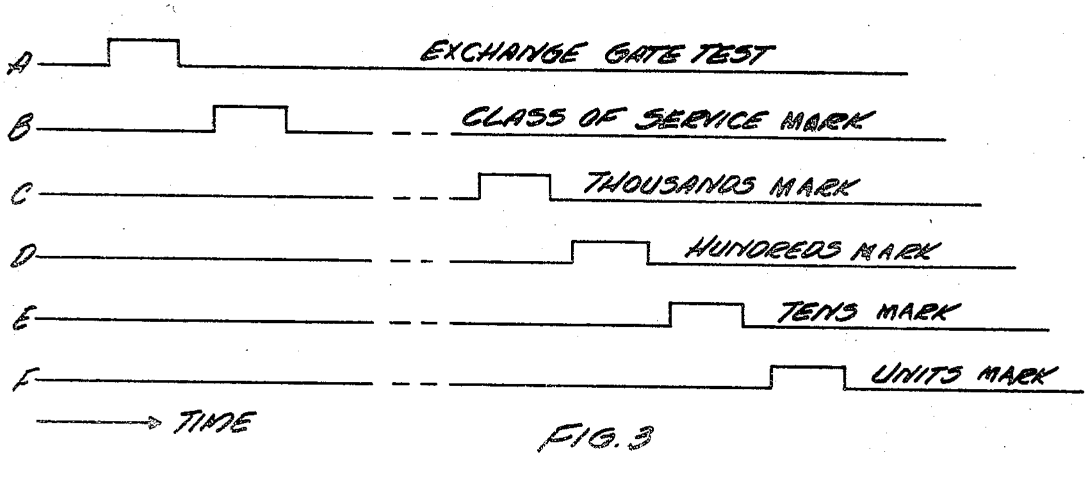
FIG. 3 represents signals used in the practice of the invention.

Signals of use in control of the gates 24 and detectors 26 are represented in FIG. 3 where signals are applied to the "class of service," "office" or "exchange" gates in a search for class signals, or office of origin of the call. In this example "class of service" or "office" marks are then indicated. The signals labeled thousands, hundreds, tens and units are then applied consecutively to the corresponding gates to provide a readout of the directory number. The office code is marked between the class of service mark and the thousands digit. These marks do not involve the digit gates or detectors, hence are not illustrated in FIG. 3.

An exchange digit gate may be "to determine the office from which a call originates, or the class of service available to the caller. In this connection, and referring again to the diagram of FIG. 1, the sequencer 16, in response to a demand for identification, places a 60 millisecond signal (FIG. 3A) on the N exchange digit gates at 24 to interrogate the matrix 20. While the 60 millisecond gating pulse is being applied, the appropriate exchange digit gate passes through any sleeve signal (from a sleeve S) that may be present on any of the thousands busses of the matrix to the detector circuits at 26. The detectors process the signal and provide a suitable output or outputs at terminal 29.

Figure 4:
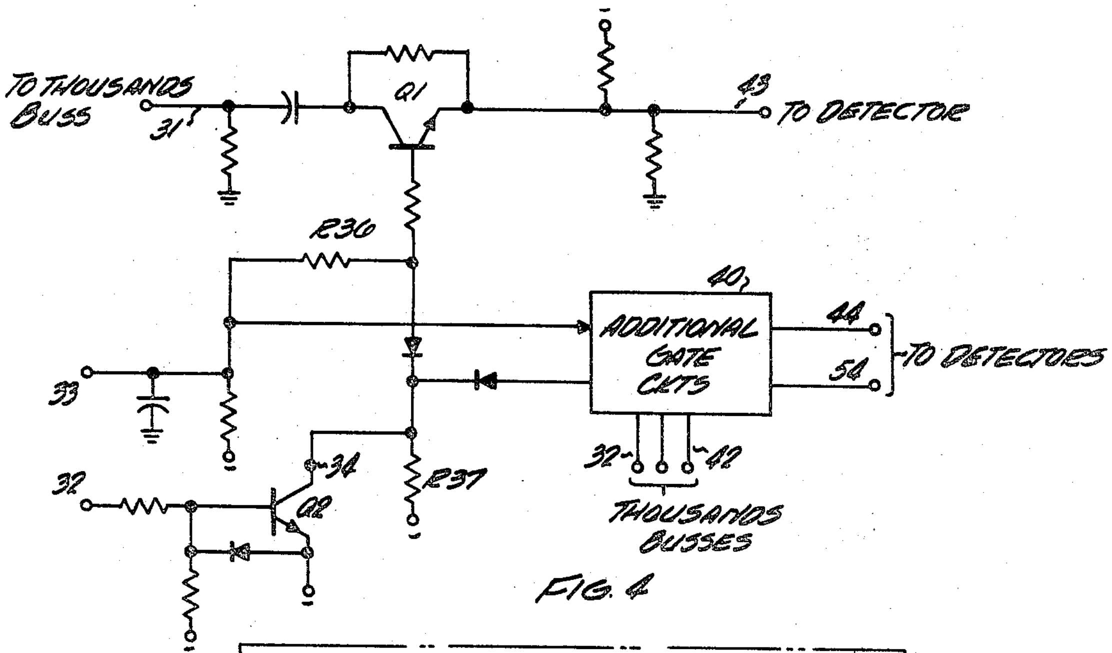
FIG. 4 illustrates an exemplary gate circuit for use with the invention.

An exemplary exchange digit gate circuit, which may be used for other gates, is shown in FIG. 4. For example, the gates in the detector 26 may be of the form shown in FIG. 4, although gates adapted from known gate circuits may be used. In this circuit a suitable pulse from a sequencer 16 or other source is applied as a gate-in signal on terminal 32. Before reception of a gate signal, assume the gate-in lead 32 is at ground potential. Accordingly, transistor Q2 will be "on" and place a negative potential (−13 volts) on terminal 34. If terminal 32 is used and 33 is strapped to ground, the gate will respond to negative control pulses. If terminal 32 is left open and 33 is used as an input, the gate will respond to application of ground.

With terminal 33 strapped to ground and ground on terminal 32, the collector of transistor Q2 (terminal 34) will be biased respectively (−13 volts). The −13 volts at the collector of Q2 holds Q1 "off" and, through terminal 40, holds "off" a plurality of other similar gate circuits (not shown).

When the gate-in signal at terminal 32 goes to −13 volts (or open), Q2 turns "off" and the collector of Q2 can rise to a value determined by R36 and its counterparts in 40, and R37. This rise in voltage will forward bias transistor Q1 allowing it to saturate. Any signal then present on the particular thousands matrix busses will pass through the gate (either Q1 or a gate at 40 associated with different thousands matrix busses indicating different classes of service or different offices) and on to the detector over terminal 43 (or a terminal 44 thru 54, corresponding to a different class of service of a gate at 40).

Figure 5:
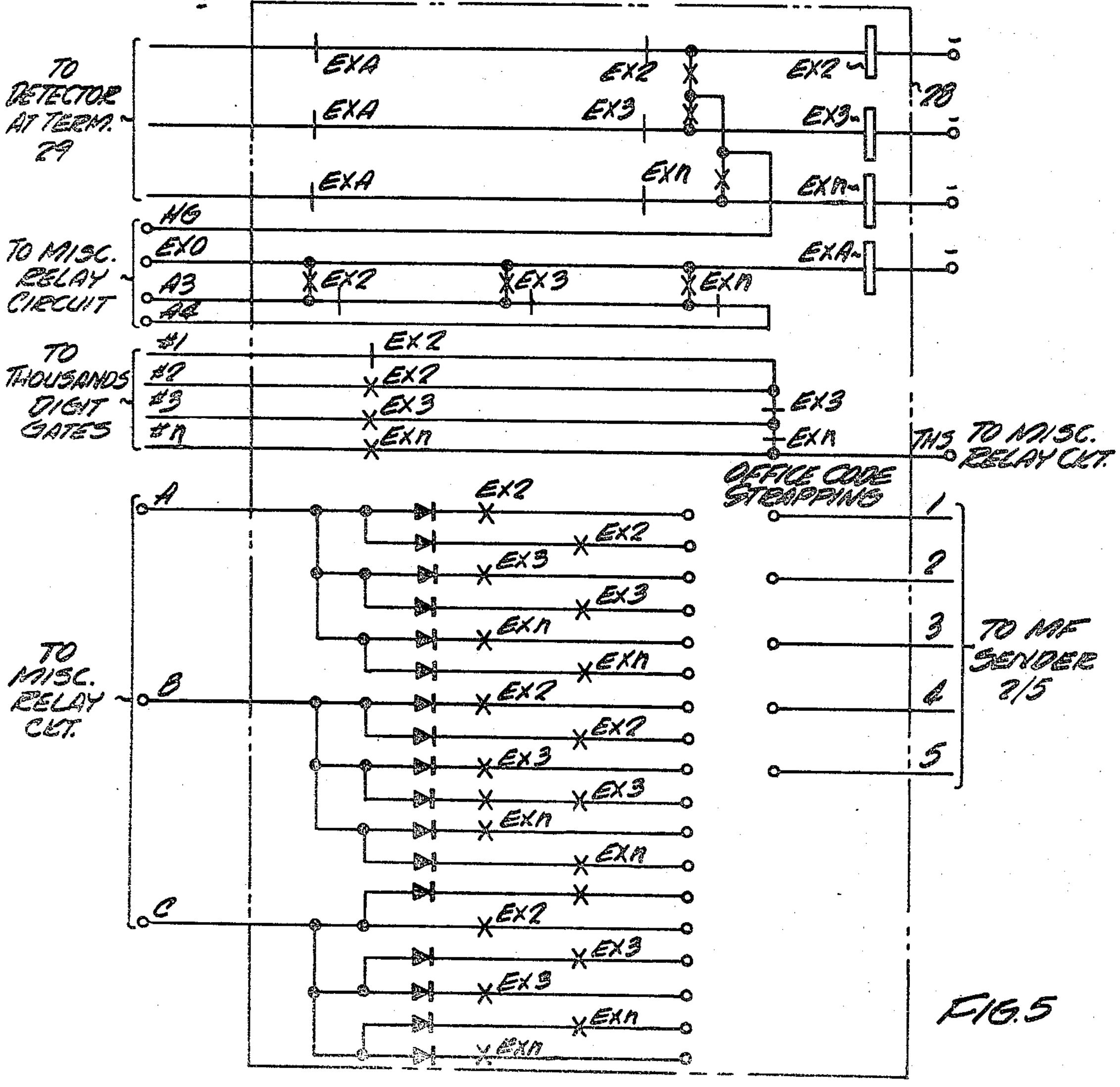
FIG. 5 shows a director circuit which provides control signals in accordance with class of call criteria.

FIG. 5 shows a director circuit, corresponding to block 28 of FIG. 1, which connects through terminals 29 separately to the individual ones of ten detectors in the detector circuit 26 and through them to a plurality of exchange digit gates. The director is connected to the miscellaneous relay circuit to receive control signals and also to supply information to that circuit.

After the class of service or the originating office has been determined from the matrix and a signal has been supplied from the appropriate thousands digit gate to one of the ten elements of the detector 26, suitable signals will appear at the terminals 29 of the director (FIG. 5). If the number 1 (01) thousands digit gate has been operated, a signal from that gate will pass from 01 terminal in FIG. 5 over the break contacts EXA to the miscellaneous relay circuits 12. The miscellaneous relay circuits can then activate the EX1 relay indicating call origination from Exchange 01 and provide signals for any other desired purpose over circuits which have not been illustrated.

If the second detector has been energized, relay EX2 will operate. On operating, relay EX2 will lock to ground in the miscellaneous relay circuit over the HG (hold ground) terminal. Terminal A3 is supplied with ground by the miscellaneous relay circuit. Ground on A3 is extended through make contacts EX2 to operate EXA. EXA operates and opens the operate path of all EX relays to prevent their operation during the call sequence when other detectors operate. Each of the relays EX3 through EXn, when operated, will function in essentially the same way as relay EX2.

Terminals A, B, and C furnish the three digits to be transmitted after the class of service. These connections provide the ABC of the office code under control of the sequential pulses from the sequencer 16.

While the principles of the invention have been described above in connection with specific apparatus and applications, it is to be understood that this description is made only by way of example and not as a limitation on the scope of the invention.

We claim:

1. A multiclass identifier for detecting signals indicating the class of service to which a calling subscriber is entitled and for providing the signals to an appropriate circuit, comprising:
- a gate circuit connected to receive signals indicative of entitled class of service over input lines from an identification matrix;
- said gate circuit providing outputs to a detector circuit independently of the subscriber's directory number;
- the detector circuit routing a further output indicative of the class of service to which a caller is entitled; and
- a director circuit responsive to said further output to provide an indication of class of service to a signal transmitting circuit and to a control circuit.

2. A multiclass identifier as claimed in claim 1, in which the gate circuit includes a transistor coupled in a normally nonconductive state to a sequencer, to a plurality of thousands busses and to the detector circuit.

3. A multiclass identifier as claimed in claim 2, in which the base circuit of the transistor includes means for receiving gate signals from the sequencer to make the transistor conductive, said transistor thereby permitting transmission of signals indicative of entitlement from the thousands busses to the detector.

4. A multiclass identifier as claimed in claim 1, in which the director circuit includes a plurality of switching means responsive to said outputs to close selected contacts and connect said thousands digit gates to the control circuit.

5. A multiclass identifier as claimed in claim 1, in which the director circuit includes a plurality of switching means responsive to said further outputs from the detector circuit to close selected contacts and connect class of service signals to the control circuit.